United States Patent [19]

Bennett

[11] Patent Number: 4,988,326
[45] Date of Patent: Jan. 29, 1991

[54] CONCAVE GRID INSERTS
[75] Inventor: Robert E. Bennett, Moline, Ill.
[73] Assignee: Deere & Company, Moline, Ill.
[21] Appl. No.: 494,643
[22] Filed: Mar. 15, 1990
[51] Int. Cl.$^5$ ....................... A01F 12/26; A01F 12/28
[52] U.S. Cl. ...................................... 460/110; 460/108
[58] Field of Search ............... 460/107, 108, 109, 110; 56/14.6; 209/394, 395

[56] References Cited

U.S. PATENT DOCUMENTS

| 2,686,523 | 8/1954 | Young ................................. 460/110 |
| 3,957,058 | 5/1976 | Komancheck ...................... 460/108 |
| 4,004,404 | 1/1977 | Rowland-Hill et al. ........ 460/110 X |
| 4,711,075 | 12/1987 | Strong ............................. 460/110 X |
| 4,711,252 | 12/1987 | Bernhardt et al. .................. 460/107 |
| 4,875,891 | 10/1989 | Turner et al. ........................ 460/110 |

OTHER PUBLICATIONS

"Assembly Instructions for Installing Concave Inserts", DM-H137983; 9400; 9500 and 9600 Combines, John Deere Harvester Works of Deere & Company, East Moline, Ill., 1 page.

John Deere Parts Catalog, 7720 Combine, Harvester Works PC-1667, dated May 31, 1979, 3 pages.
FMO, Fundamentals of Machine Operation, Combine Harvesting, John Deere, 2 pages.
Agricultural Sales Manual, John Deere, Rev. 177, Oct. 1989, printed in the U.S., 2 pages.

Primary Examiner—Stephen J. Novosad

[57] ABSTRACT

A grid insert assembly for a concave of an agricultural threshing machine having a frame formed from two side walls that define a slot. The slot engaging a cross bar of the concave. Each side wall is provided with an engagement aperture. The engagement apertures are coaxial with a grid insert mounting aperture located on the concave cross bar. A U-shaped mounting pin, having an engagement leg is selectively positioned into and out of the slot through the engagement apertures for securing the grid insert to the concave cross bar. A mounting leg of the mounting pin is slidably positioned in mounting ears extending from the grid insert. A latching assembly for latching the mounting pin is formed by an elastomeric sleeve which engages the mounting leg of the mounting pin.

10 Claims, 2 Drawing Sheets

CONCAVE GRID INSERTS

BACKGROUND OF THE INVENTION

1. Field of the Invention

The invention is directed to an assembly for easily attaching grid inserts to the concave of an agricultural threshing machine to simulate concave wires.

2. Description of the Prior Art

Combines and other agricultural threshing machines are provided with a threshing cylinder and concave for beating the grain from its husk or head. Typically, in a conventional combine, a transverse threshing cylinder is provided with a plurality of rasp bars which engage the crop and force it down against the concave.

The concave itself comprises a series of parallel steel cross bars which are held together by curved longitudinal side bars. Wire rods are also inserted through the cross bars. Increased grain separation from the material other than grain (MOG) can be achieved by removing concave wires in the rear of the concave. Removing wires lets greater quantities of chaff material imbedded with the grain fall through the concave openings onto the cleaning shoe. In some crops the cleaning shoe load can become too great, depending on crop conditions, and it is necessary to add full length wires back into the concave. Adding or removing wires from a concave can be very time consuming. When short wires are substituted for long wires, the wire holes in the concave cross bars fill with MOG potentially causing plugging and reducing separation capacity of the concave.

SUMMARY OF THE INVENTION

It is the main object of the present invention to provide a simplified grid insert that can be easily mounted onto a concave to simulate adding concave wires.

It is another object of the present invention to increase the versatility of a concave by providing grid inserts that can be easily installed or removed as crop conditions dictate.

It is a feature of the present invention that the concave cross bars are pre-drilled with grid insert mounting apertures for accepting the grid insert mounting assembly.

It is another feature of the present invention that the grid insert itself is provided with a U-shaped mounting pin which passes through the grid insert and the associated grid insert mounting aperture in the concave cross bar.

It is another feature of the present invention that the mounting pin is provided with a latching assembly comprising an elastomeric sleeve which frictionally holds the mounting pin either in an engaged or disengaged position between two mounting ears.

The grid insert structure of the present invention comprises a frame having two side walls which define a slot which engages a concave cross bar. Each side wall is provided with an engagement aperture. The engagement apertures are coaxial to one another. These apertures also correspond to the grid insert mounting aperture in the concave cross bar. Extending perpendicular from the side walls are the grid insert segments which simulate additional wire and provide an obstruction for grain passing between the cross bars.

The mounting pin itself is secured to the grid insert by mounting ears extending from the backside of the frame. Each of the mounting ears is provided with a hole through which the mounting leg of the mounting pin passes. An elastomeric sleeve is secured to the mounting pin between the mounting ears which acts as a latch for holding the mounting pin in an engaged or disengaged position. The mounting pin is U-shaped and is provided with an engagement leg that passes through the engagement apertures in the side walls and the grid insert mounting aperture in the concave cross bars to lock the grid insert to the concave.

DETAILED DESCRIPTION

Figure 1:
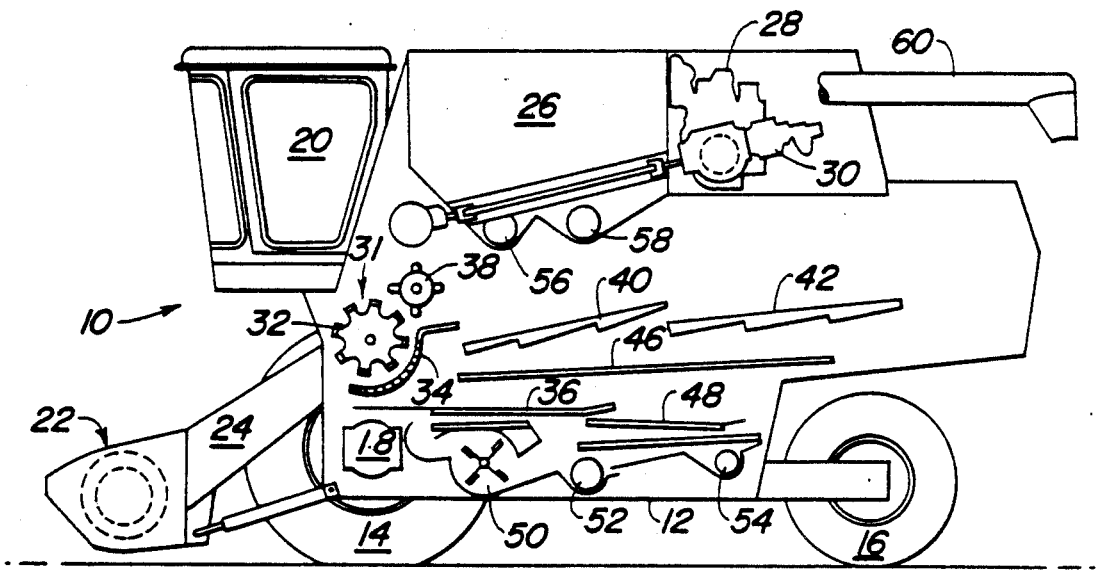
FIG. 1 is a side view of a combine schematically illustrating the various operating assemblies.

FIG. 1 illustrates an agricultural combine 10 having a chassis 12 and ground engaging wheels 14 and 16. Forward ground engaging wheels 14 are driven by hydraulic motor 18 located between the wheels. An operator seated in operator control cab 20 controls the operation of the combine. Harvesting platform 22 extends forwardly from the chassis of the combine and is used for harvesting a crop in the field. After harvesting, the crop is then directed through feeder house 24 and into the combine.

Clean grain compartment 26 is located behind the operator's cab at the top of the combine. Behind compartment 26 is transverse internal combustion engine 28 which is the prime mover of the combine powering the propulsion means, the harvesting means, and the threshing and separating means. The internal combustion engine 28 is provided with a driving means 30 for powering the various usage assemblies. A better description of the drive assembly is contained in U.S. Pat. No. 4,843,803, assigned to the assignee of the present application, and which is incorporated herewith by reference.

Between the side sheets of the combine, which form the chassis of the combine, is located the threshing and separating means. The threshing and separating means separates the grain from the straw and chaff of the harvested crop. The feeder house directs the harvested grain to a threshing means 31 which comprises a rotating transverse threshing cylinder 32, a transverse concave 34, and a rotating beater 38. As the crop passes between the cylinder 32 and the concave 34, grain and chaff fall through the concave to a pan 36 and the remaining straw and separating grain is advanced to the beater 38.

After threshing, the straw in the crop is advanced to a separating means 39. The main elements of the separating means are straw walkers 40 and 42, and a cleaning shoe assembly 48. From the beater 38, the crop is advanced to oscillating straw walkers 40 and 42 which direct the straw to the rear of the combine from which is returned to the field. Grain and chaff falling through the straw walkers falls onto an oscillating slanted pan 46 which directs the grain and chaff to the pan 36. The grain and chaff are directed from the pan 36 by overhead auger assemblies (not shown) to a cleaning shoe assembly 48 which is used to separate the chaff from the grain.

The grain and chaff falling onto the chaffer and sieve of the cleaning shoe assembly encounter an air stream from a fan 50 which blows the lighter chaff out the rear of the combine while the heavier grain falls through the cleaning shoe assembly and into a clean grain receiving auger 52. The auger 52 directs the clean grain to a clean grain elevator (not shown) which in turn directs the grain to the clean grain compartment 26. Tailings, that is unthreshed heads of grain, fall into a tailings auger 54 which directs the unthreshed heads back to the threshing cylinder and concave. When the clean grain compartment is to be unloaded, transverse unloading augers 56 and 58 direct the grain to the side of the compartment from where it comes into contact with a vertical unloading auger (not shown) which directs the clean grain through an unloading tube 60.

Figure 2:
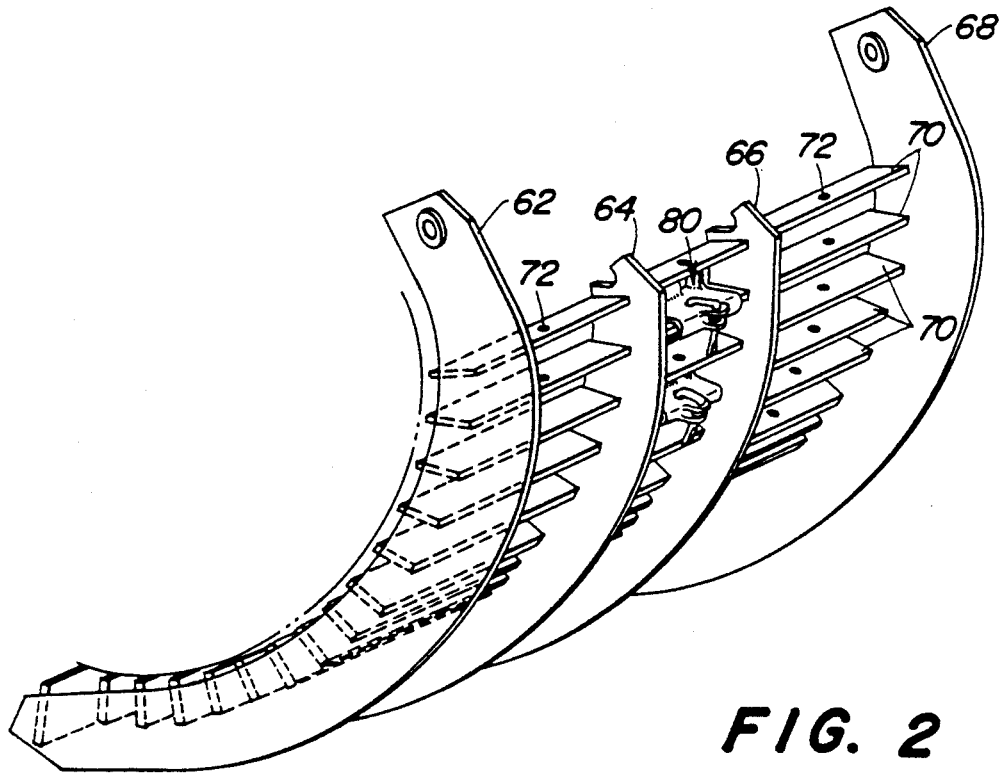
FIG. 2 is a perspective view of a concave having two grid inserts.

It should be noted that this invention is directed to a simplified means for mounting grid inserts to a concave. The concave illustrated in FIG. 2 is provided with four curved longitudinal bars 62, 64, 66 and 68 which are joined together by a series of cross bars 70. A grid insert mounting aperture 72 is formed in each of the cross bars between the curved longitudinal bars. The concave is also provided with parallel wire rods which extend from the front cross bar to the cross bar fifth from the end. These wire rods do not extend past the fifth cross bar from the end as this area is left open for increased grain separation. For simplicity the wire rods are not illustrated in this drawing.

In FIG. 2 a first grid insert is centrally mounted on the next to last cross bar, and a second grid insert is centrally located on the fourth from last cross bar. Each of these grid inserts are provided with grid insert segments 90 that simulate wire rods extending from the fifth from last cross bar to the last cross bar in the central region of the concave. Additional grid inserts would typically be mounted along the next to last and fourth from last cross bars, but are not illustrated in FIG. 2.

Figure 3:
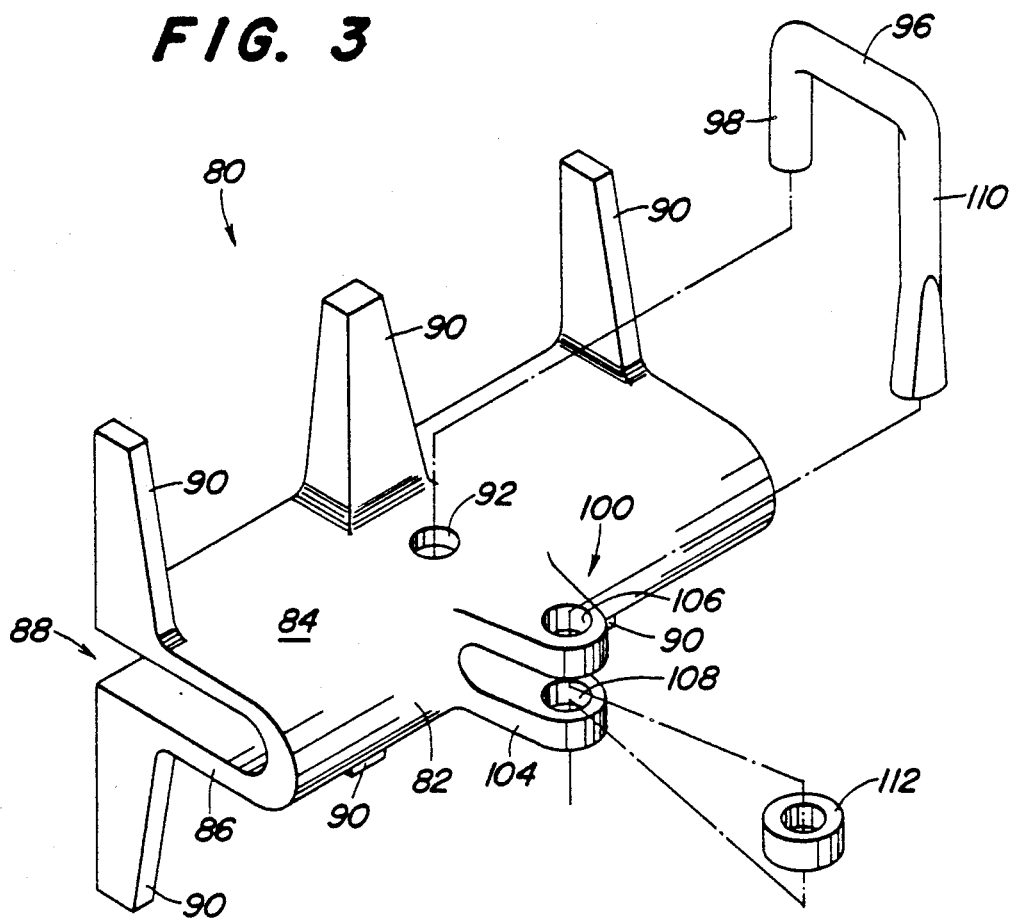
FIG. 3 is an exploded view of the grid insert.
Figure 4:
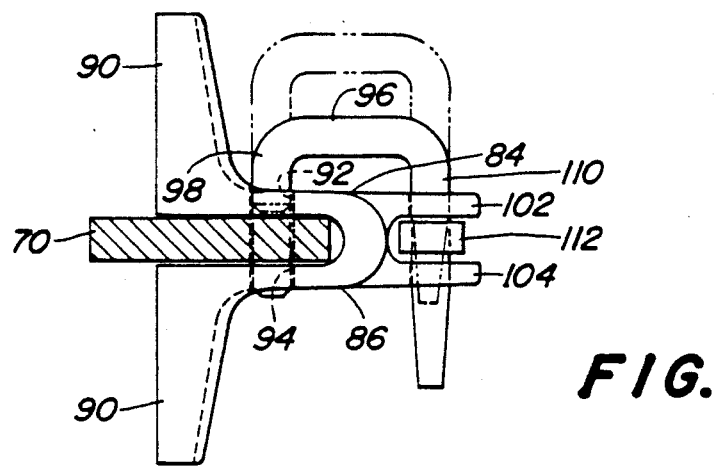
FIG. 4 is a cross sectional side view of the grid insert.

The grid insert assembly is best illustrated in FIGS. 3 and 4 and comprises a frame 82 having a first side wall 84 and a second side wall 86 which define a slot 88. Extending perpendicular from the side walls are grid insert segments 90. A first engagement aperture 92 is formed in the first side wall 84. Similarly, a second engagement aperture 94 is located in the second side wall 86. An U-shaped mounting pin 96 having an engagement leg 98 can be inserted through the first and second engagement apertures 92 and 94. When the cross bar 70 is located in the slot 88 and the grid insert mounting aperture 72 is located coaxially with the first and second engagement apertures 92 and 94, the engagement leg 98 maybe inserted through the apertures locking the grid insert to the concave.

The grid insert frame is also provided with a mounting assembly 100 comprising first and second mounting ears 102 and 104. The first mounting ear 102 is provided with a first mounting aperture 106, whereas the second mounting ear 104 is provided with a second mounting aperture 108. A mounting leg 110 of the mounting pin 96 is slidably mounted in the first and second mounting apertures. An elastomeric sleeve 112 engages the mounting leg 110 and provides a latching assembly for holding the mounting pin in an engaged or disengaged position.

The invention described above should not be limited to the embodiments described above, but should be limited solely by the claims that follow.

I claim:

1. A grid insert for a concave of an agricultural threshing machine, the grid insert comprising:
    a frame having a slot defined by first and second sidewalls, the first sidewall is provided with a first engagement aperture and the second sidewall is provided with a second engagement aperture that is coaxial with the first engagement aperture, the frame is also provided with grid insert segments and a mounting assembly; and
    a mounting pin slidably mounted to the mounting assembly and being located so as to extend selectively into both of the coaxial first and second engagement apertures, whereby when the grid insert is mounted to a concave the slot engages a concave cross bar and the coaxial first and second engagement apertures overlie an aperture located in a cross bar of a concave so that the mounting pin can extend into both the first and second engagement apertures and through a cross bar aperture for locking the grid insert to a concave.

2. A grid insert as defined by claim 1 wherein the mounting assembly comprises first and second ears extending from the frame, the first ear having a first mounting aperture and the second ear having a second mounting aperture that is coaxial with the first mounting aperture, the mounting pin is slidably mounted in the first and second mounting apertures.

3. A grid insert as defined by claim 2 wherein the mounting pin is a U-shaped pin having a mounting leg slidably extending through the mounting apertures and an engagement leg selectively extending into the first and second engagement apertures.

4. A grid insert as defined by claim 3 further comprising a latching assembly for latching the mounting pin into a position where the engagement leg extends into the first and second engagement apertures; or latching the mounting pin into a position where the engagement leg does not extend into both the first and second engagement apertures.

5. A grid insert as defined by claim 4 wherein the latching assembly comprises an elastomeric sleeve that 6. A concave for an agricultural threshing machine, the concave comprising:
    curved longitudinal bars;
    transverse cross bars joining the curved longitudinal bars, at least one of the cross bars is provided with a grid insert mounting aperture located between adjacent longitudinal bars for mounting a grid insert to the concave; and
    a grid insert for a concave of an agricultural threshing machine, the grid insert having a frame defining a slot by first and second sidwalls, the first sidewall is provided with a first engagement aperture and the second sidewall is provided with a second engagement aperture that is coaxial with the first engagement aperture, the frame is also provided with grid insert segments and a mounting assembly and a mounting pin slidably mounted to the mounting assembly and being located so as to extend selectively into both of the coaxial first and second engagement apertures and the grid insert mounting aperture in the concave cross bar.

7. A concave as defined by claim 6 wherein the mounting assembly comprises first and second ears extending from the frame, the first ear having a first mounting aperture and the second ear having a second mounting aperture that is coaxial with the first mounting aperture, the mounting pin is slidably mounted in the first and second mounting apertures.

8. A concave as defined by claim 7 wherein the mounting pin is a U-shaped pin having a mounting leg slidably extending through the mounting apertures and an engagement leg selectively extending into the first and second engagement apertures.

9. A concave as defined by claim 8 further comprising a latching assembly for latching the mounting pin into a position where the engagement leg extends into the first and second engagement apertures, or latching the mounting pin into a position where the engagement leg does not extend into both the first and second engagement apertures.

10. A concave as defined by claim 9 wherein the latching assembly comprises an elastomeric sleeve that frictionally engages the mounting leg of the mounting pin between the first and second ears.

* * * * *

UNITED STATES PATENT AND TRADEMARK OFFICE
CERTIFICATE OF CORRECTION

PATENT NO.  : 4,988,326
DATED       : 29 January 1991
INVENTOR(S) : Robert E. Bennett It is certified that error appears in the above-identified patent and that said Letters Patent is hereby corrected as shown below:

```
Column 4, line 41, after "that" insert --frictionally
engages the mounting leg of the mounting pin between the
first and second ears.--
```

Signed and Sealed this

Thirtieth Day of June, 1992

Attest:

DOUGLAS B. COMER

*Attesting Officer*   *Acting Commissioner of Patents and Trademarks*